Nov. 22, 1960     E. J. KJELLSTROM     2,961,279
TRAYS FOR AUTOMOBILES AND OTHER VEHICLES
Filed Oct. 8, 1958     2 Sheets-Sheet 1
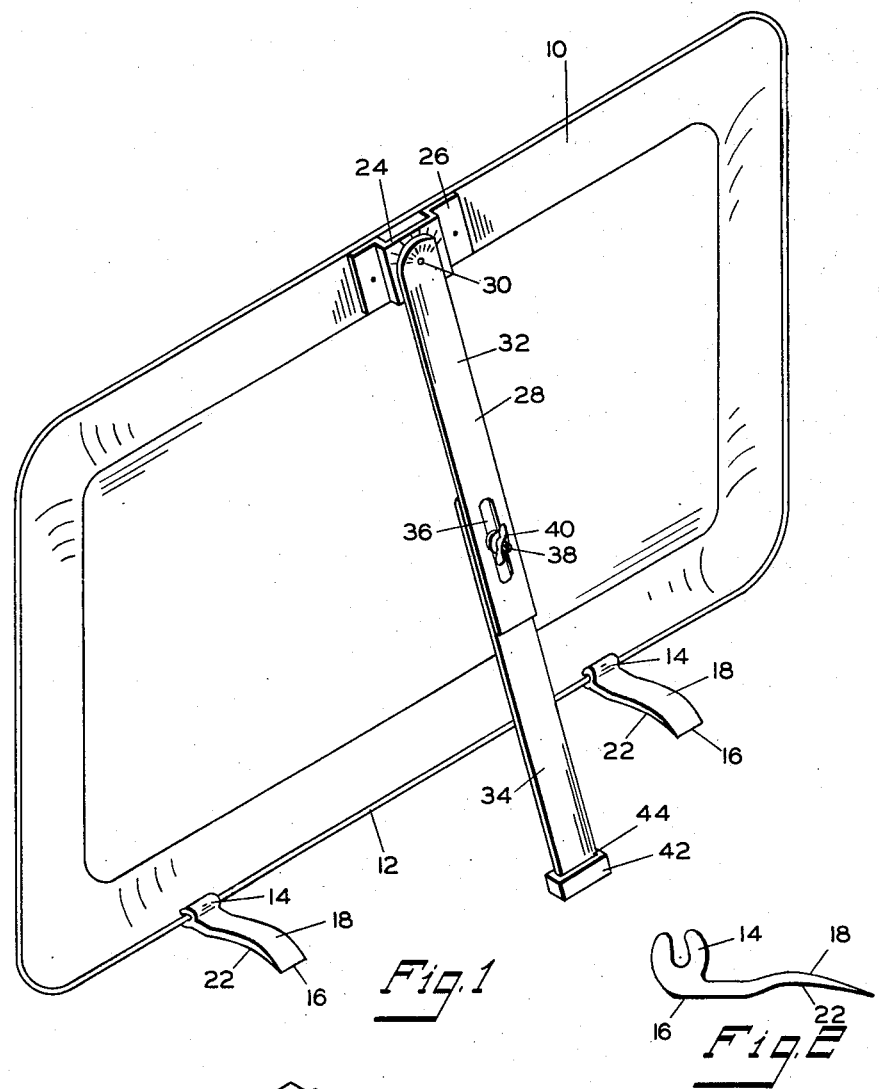
*INVENTOR.*
ELVING J. KJELLSTROM
BY *Joseph G. Werner*
ATTORNEY Nov. 22, 1960     E. J. KJELLSTROM     2,961,279
TRAYS FOR AUTOMOBILES AND OTHER VEHICLES
Filed Oct. 8, 1958     2 Sheets-Sheet 2
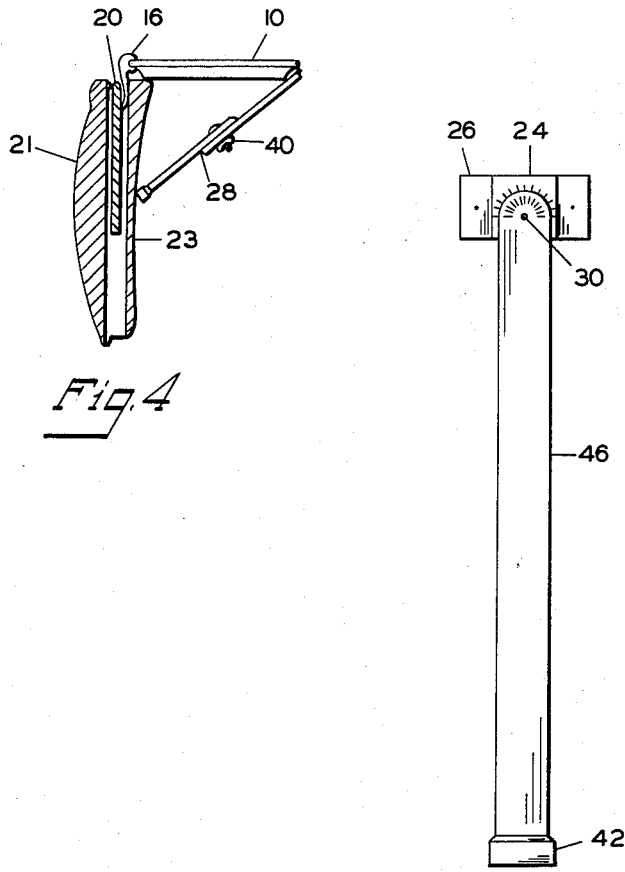
INVENTOR.
ELVING J. KJELLSTROM
BY *Joseph G. Werner*
ATTORNEY

United States Patent Office 2,961,279
Patented Nov. 22, 1960

2,961,279

TRAYS FOR AUTOMOBILES AND OTHER VEHICLES

Elving J. Kjellstrom, Oregon, Wis., assignor to Wisconsin Mold & Tool Co., Inc., Oregon, Wis., a corporation of Wisconsin Filed Oct. 8, 1958, Ser. No. 765,981

2 Claims. (Cl. 311—22)

This invention relates to trays and particularly to trays that may be detachably secured to the doors and other parts of automobiles and other vehicles.

Various types of automobile window trays are used at "drive-in" restaurants to provide for delivery and service of food and beverages to passengers. The tray of the present invention is designed primarily as a collapsible tray that may be regularly carried in an automobile and readily attached inside the car when needed. My tray thus provides table facilities inside the automobile for the passengers, and may be attached to the doors, ash trays or other appropriate supports within the vehicle. My invention has important features not believed to have been disclosed in the trays previously invented.

It is an object of this invention to provide a tray for attachment to automobiles and other vehicles which may be conveniently collapsed for shipping, and for storage in the vehicle.

Another object of this invention is to provide a tray as described which may be adjusted for attachment to doors of automobiles of various makes and sizes.

A further object of this invention is to provide a tray as described which is easily attached to, and detached from, the vehicle.

An additional object of this invention is to provide a tray as described which is inexpensive to manufacture.

Other objects and advantages will be apparent from the following description and the accompanying drawings.

In the drawings:

Fig. 1 is a perspective view of the bottom of the tray.

Fig. 2 is a side view of one of the tray clips.

Fig. 3 is a perspective view of the end of the tray brace and ratchet therefor.

Fig. 4 is a cross sectional view of an automobile door and window with a side view of my tray attached thereto.

Fig. 5 is a plan view of a modified tray brace.

Tray 10 has rolled edge 12 over which are snapped the grooved ends 14 of tray clips 16. The tray may be flat or flared near the edges as shown in Fig. 1. The tray may be of various shapes though preferably rectangular.

The side 18 of the tray clip 16 should preferably be convex in shape with a hollowed area 22 at the opposite side. Tray clip 16 may be of plastic or a metal which will provide a resilient or spring tension as its tapering end rests against the window as shown in Fig. 4. Tray clips 16 are hinged over rolled edge 12 and are slidable along and on the rolled edge 12.

Channel iron 24 with flanges 26 is secured near the edge of the underside of the tray 10 opposed to the edge holding tray clips 16. Tray brace 28 is pivotally attached to channel iron 24 by bolt and nut or rivet 30. The surfaces of channel iron 24 and tray brace 28 are provided with ratchet 31 and pawl 33 to retain the tray brace 28 in any desired position relative to tray 10. Tray brace 28 may be of a single piece of metal or similar material 46 shown in Fig. 5, or preferably, it may be in two pieces 32 and 34 as shown in Fig. 1. When constructed in two pieces, one or both pieces have slots 36 with bolt 38 and wing-nut 40 to permit adjustment of tray brace 28 to any desired length. Rubber cap 42 may be fitted over the free end 44 of tray brace 28. Tray brace 28 extends at an acute angle of about 45 degrees or less to constitute a brace against the door of the automobile when the tray is in use.

When in use tapering ends of tray clips 16 are dropped between the upper edge of the inner panel 23 of the automobile door 21 and the window 20, as shown in Fig. 4. Tray 10 then extends substantially horizontally from the grooved ends 14 of tray clips 16. The length of tray brace 28 may be adjusted by loosening wing nut 40 and then shortening or lengthening brace 28 and retightening wing nut 40 to provide a support against the inner panel 23 of the door 21, and to maintain the tray in substantially horizontal position. Rubber cap 42 prevents tray brace 28 from slipping and also prevents scratching of the door.

The spring tension created by the pressure of tray clips 16 against the window 20 and against the inner panel 23 of the door 21 and the tray brace 28 retain the tray securely in place. Such spring tension also provides for secure attachment even though there may be slight unevenness or curvature in the glass or door panel. Tray clips 16 may be pushed closer together or farther apart as may be required to fit the size of the window or other support. For example, by pushing the tray clips 16 close together they may be dropped over the edge of a pull-out ash tray on the rear side of the front seat of an automobile, and the ash tray pushed closed with tray clips 16 held between the ash tray and the back of the front seat. The length of the tray brace 28 may then be adjusted to rest against the rear side of the front seat. By such arrangement the tray would extend from the rear side of the front seat and would be available to all persons sitting on the rear seat of the automobile for placing their food and beverages. Likewise, as can be seen in Fig. 4, the tray may be used either on the inside or outside of the automobile.

Where the tray brace 28 is in one piece 46, as shown in Fig. 5, the adjustment to retain the tray 10 in horizontal position is achieved by turning tray brace 28 on pivot rivet 30 until the proper adjustment is made, permitting rubber cap 42 to rest against the door or other portion of the automobile. Pawl 33 and ratchet 31 retain tray brace 28 firmly in place with respect to tray 10.

When the tray is not in use tray clips 16 may be swung against tray 10, tray brace 28, if in two pieces as shown in Fig. 1, may be shortened to its shortest position by adjustment with wing-nut 40. Tray brace 28 may be turned on pivot rivet 30 if desired. Thus, the tray may be folded compactly so that it may be easily carried in the automobile for use when needed. Also by reason of such compactness the tray may be boxed and stored with a minimum of boxing and shipping space.

It is to be understood that the particular construction and arrangement of parts hereinabove illustrated and described represent a preferred embodiment of the principles of the invention, which embrace all such modifications thereof as may come within the scope of the following claims.

I claim:

1. A tray for temporary attachment to an automobile door having panels with an intervening window comprising, a substantially flat body portion having a rolled edge, downwardly extending resilient bow-shaped tray clips slidably and hingedly secured to said rolled edge at one side of said body portion whereby the downwardly extending portion of the tray clips are wedged between the window and a panel of the door, a tray brace having one end thereof secured at the opposed side of said body portion to extend to a panel of the door, means at the other end of said tray brace to maintain said end in fixed position when in contact with said door panel.

2. A tray for temporary attachment to automobile doors and like supports comprising, a substantially flat body portion having a rolled edge, resilient bow-shaped tray clips slidably and hingedly secured to said rolled edge at one side of said body portion, a tray brace having means for adjusting its length with one end thereof pivotally secured at the opposed side of said body portion, ratchet means between said tray brace and said tray, and means at the opposed end of said tray brace to maintain said end in fixed position when in contact with said supports.

References Cited in the file of this patent
UNITED STATES PATENTS

| | | |
|---|---|---|
| 1,836,511 | Severns | Dec. 15, 1931 |
| 1,863,368 | Fulmer | June 14, 1932 |
| 1,965,955 | De Foe et al. | July 10, 1934 |
| 2,430,049 | Flory | Nov. 4, 1947 |
| 2,584,557 | Cuthbertson | Feb. 5, 1952 |
| 2,619,395 | Kent | Nov. 25, 1952 |
| 2,686,702 | Ventrice | Aug. 17, 1954 |
| 2,833,608 | Tobias | May 6, 1958 |